(12) United States Patent
Struszczyk et al.

(10) Patent No.: US 6,576,708 B1
(45) Date of Patent: Jun. 10, 2003

(54) MODIFIED FIBRES AND OTHER PRODUCTS FROM POLYPROPYLENE AND PROCEDURES FOR THE MANUFACTURE OF MODIFIED FIBRES AND OTHER PRODUCTS FROM POLYPROPYLENE

(75) Inventors: Henryk Struszczyk, Zgierz (PL); Karlina Grzebieniak, Ksawerow (PL); Alojzy Urbanowski, Lodz (PL); Arkadiusz Wilczek, deceased, late of Pabianice (PL), by Marianne Fuierer, legal representative; Stanislaw Galecki, Lodz (PL); Jan Kazmierski, Lowicz (PL); Konrad Kazmierski, Lowicz (PL)

(73) Assignee: Instytut Wlokien Chemicznych, Lodz (PL)

( * ) Notice: Subject to any disclaimer, the term of this patent is extended or adjusted under 35 U.S.C. 154(b) by 0 days.

(21) Appl. No.: 09/551,056

(22) Filed: Apr. 18, 2000

(30) Foreign Application Priority Data

Apr. 30, 1999 (PL) ................................................. 332926

(51) Int. Cl.[7] .......................... C08L 23/00; C08L 23/04; C08F 8/00
(52) U.S. Cl. ....................................... 525/191; 525/240
(58) Field of Search ................................. 525/191, 240

(56) References Cited

U.S. PATENT DOCUMENTS 6,245,856 B1 * 6/2001 Kaufman et al. ........... 525/240

FOREIGN PATENT DOCUMENTS

| EP | 0 826 78 | 3/1998 |
| WO | WO 98/31744 | 7/1998 |
| WO | WO 00/34385 | 6/2000 |

* cited by examiner

Primary Examiner—Nathan M. Nutter
(74) Attorney, Agent, or Firm—Marianne Fuierer; Steven J. Hultquist; Yongzhi Yang

(57) ABSTRACT

A polypropylene composition and modified fibers thereof, includes polypropylene and an elastomer. The elastomer has a melting temperature of, at least, 80° C., preferably 100–180° C., a melt flow index in the range of 1–60 g/10-min., and a density within the range of 0.85–0.95 g/cm$^3$. The elastomer is a branched copolymer of an ethylene copolymer, a polyolefin copolymer or a combination thereof, with ethylene, higher alkene groups, or both ethylene and higher alkene groups in the main chain of the branched copolymer, and with a weight proportion of polypropylene to elastomer being in the range of from 99.9:0.1 to 0.1:99.9. A method for producing the polypropylene composition and modified fibers thereof is also disclosed.

18 Claims, No Drawings

MODIFIED FIBRES AND OTHER PRODUCTS FROM POLYPROPYLENE AND PROCEDURES FOR THE MANUFACTURE OF MODIFIED FIBRES AND OTHER PRODUCTS FROM POLYPROPYLENE

BACKGROUND OF THE INVENTION

1. Technical Field of the Invention

The invention concerns modified fibres and other polypropylene products like film, nets or casings and the procedure for their manufacture.

2. Description of the Prior Art

From the monography "Polypropylene Fibres—Science and Technology" Elsevier Scientific Publ. Comp. 1982 and from U.S. Pat. No. 3,256,258, a procedure is known to produce polypropylene fibres with increased elasticity. The procedure consists of attaining a specific orientation of the fibres by the application of a relevant melt-drawing ratio (no more than 2.5) in the course of fibre forming and relaxation at 105–160° C. during 30–60 minutes in the course of fibre processing. Fibres produced this way are characterized by a 100–700% elongation at break and 82% elasticity at 25% elongation.

International patent application PCT/US96/11085 and Polish Patents P.322371 and P.317596 disclose polyolefin composites with high surface lustre and impact resistance, designed for formed and extruder sheets, and shaped pieces. These products excepting polypropylene or polyethylene, contain elastomeric olefin copolymers. These composite thermoplastic olefins are manufactured by blending the single components in a blender and with further forming on a roller at elevated temperature or by extrusion.

The composites include the following components: polypropylene homopolymer or its copolymers with other polyolefins, olefin polymers formed by a one-or two step sequential polymerization, copolymers of ethylene with $C_3$–$C_8$ α-olefins and elastomeric copolymers of ethylene, and $C_3$–$C_8$ α-olefins polymerized with metalocene catalysts.

From the Polish Patent Application P.3 18763 fibres and non-wovens are produced from a blend of a highly crystalline polypropylene and a statistic propylene-ethylene block copolymer. The tenacity of such product is comparable with standard polypropylene non-wovens, however, its softness is higher.

U.S. Pat. Nos.: 4,302,557, 4,336,212, 4,336,350, 4,379,888, 4,454,303, 4,481,334, 4,499,241, 4,537,935, 4,701,496, 4,835,218, 5,352,518 describe composites containing a non-elastic polymer like polypropylene and polyethylene, an elastic polyolefin like polyvinylacetal and an elastomer like an ethylene-α-olefin copolymer. These composites are designed for the manufacture of films shrinking at low temperature.

In "Vlakna a Vextil" Vol. 1(1) p. 11–16, 1994; "Fibres & Textiles in Eastern Europe" Vol.2(2) p.42–43, 1994 and Vol.2(3) p.38–42, 1994; Japanese Patent No. 85.81316, Belgian Patent No. 895355, German Patent No. 2832218 and U.S. Pat. No. 4,055,608 procedures are described for the manufacture of modified polypropylene fibres by forming same from blends of polypropylene with other known miscible polymers like polyethylene and its non-elastic polyolefin copolymers, polyamides, copolyamides, and polyesters. Fibres made from modified polypropylene have better dyeability, better mechanical properties and higher moisture sorption.

SUMMARY OF THE INVENTION

Modified fibres and other polypropylene products like film, nets and designs made according to the invention constitute a polymeric blend of standard polypropylene and an elastomer with melting point above 80° C., preferably 100–180° C., the melt flow index in the 1–60 g/10 min. range and density within 0.85–0.95g/cm³. The elastomer constitutes a branched copolymer of ethylene and/or polyolefin copolymer with ethylene and/or higher alkene groups in the main chain. The weight proportion of polypropylene to the elastomer is between 99.9:0.1 to 0.1:99.9.

According to the invention the procedure to produce fibres and other polypropylene products like film, nets or casings consists in the blending of standard polypropylene granulates in a weight proportion between 99.9:0.1 to 0.1:99.9 with an elastomer granulate with a melting point not lower than 80° C. preferably 100 to 180° C., and a melt flow index in the 1–60 g/10 min range and density with in 0.85–0.95g/cm³. The elastomer constitutes a branched copolymer of ethylene and/or a polyolefin copolymer with ethylene and/or higher alkene groups in the main chain. Fibres and other products are formed from the blend of granulates at a temperature within 190–290° C. according to known manufacturing procedures.

The procedure to produce fibres and other polypropylene products like film, nets or casings consists also in the blending of standard polypropylene in a weight proportion between 99.1:0.1 to 0.1:99.9 with an elastomer with a melting point not lower than 80° C. preferably 100 to 180° C., and a melt flow index in the 1–60g/10 min range and density within 0.85–95g/cm³. The elastomer constitutes a branched copolymer of ethylene and/or a polyolefin copolymer with ethylene and/or higher alkene groups in the main chain. The obtained blend is melted at 190–260° C., and from the melt a strand or band is extruded, which after solidification at 15–30° C. is granulated and possibly vacuum-dried at 60–80° C. Fibres and other polypropylene fibres are formed from the obtained granulate according to known manufacturing procedures.

In the manufacturing procedures according to the invention the elastomer is preferably applied as a concentrate obtained by blending 50–99% of the elastomer with the granulate of a polyolefin carrier like polypropylene or polyethylene. The blend is then regranulated at 190–260° C. The concentrate mixed in the weight proportion of 1–99% with standard polypropylene. The merit of the modified fibres and other polypropylene products according to the invention is the dependence of their properties on the content of the elastomer component in the polymer blend. With the increase of the elastomer content, the elasticity of products increases while the elongation module and the elastic strain during elongation decrease. Modified polypropylene fibres containing up to 30 wt % of the elastomer manifest mechanical properties like module and elastic strain resembling polyamide fibres. Fibres with 30–50 wt % of the elastomer component are characterized by significantly improved elastic properties. Before drawing they resemble elastomer polyurethane fibres in respect to tenacity, module and strain in the elastic deformation area. They are distinguished by a 700–800% elongation at break, increased to 80–85% elasticity for 1 cycle and 70–80% for 5 cycles at elongation ϵ=50% and by elasticity module lowered to 10 cN/tex and strain at 50% elongation lowered to 1 cN/tex. Adequate properties for elastomeric monofilaments having a linear density of 44 dtex of Lycra type are: elongation at break- 500%, elasticity at elongation ϵ=50% for 1 and 5 cycles- 100%, elasticity module appr. 0.8cN/tex and strain at elongation $\epsilon=50\%$ -about 0.4 cN/tex. After drawing, these fibres are in respect of module comparable to low-module polyamide filaments. Non-oriented fibres with 50 wt % elastomer content resemble much more high-elastic elastane fibres than those with a content of elastomer below 50 wt %. The characteristic of other modified polypropylene products is similar depending upon the content of the elastomer. Up to 30 wt % content of the elastomer, the fibres and other products, according to the invention, have good resistance properties in comparison with standard polypropylene products and, besides, a much improved elasticity and are subject to deformation in the elastic area.

The advantage of the method according to the invention is the possibility to form modified fibres and other polypropylene fibres on existing production facilities. A further advantage of the modified polypropylene products is the possibility to dye from dye liquors.

Modified fibres and other polypropylene products as well as the procedures to their manufacture can be applied in the chemical fibres industry and for the manufacture of products with special properties. particularly improved softness and elasticity.

Following methods were applied in the testing of polymers, fibres and film:

Melting point—the melting temperature range of the sample was determined using Boetnis microscope at temperature increase 4–5° C./min, Melt Flow Index using a plastometer. The weight of the extruded sample was measured at 230° C. with 21.1 N load throng a 2 mm capillary during 3 minutes Titre—according to Standard PN-EN ISO 2060

Tenacity of the filaments $\sigma_r$ and elongation at break $\epsilon_r$—according to Standard PN-EN ISO 2062

Young's modulus of elasticity—according to Standard PN-84/P-04669

Resilience of the filaments—according to Standard PN-84/P-04667

Tenacity and elongation at break for film was tested according to Standard PN-8 1/C 89092

Resilience of film—film bands 15 mm wide 100 mm long (between clamps) were extended and released with 50 mm/mm speed. The relaxation time both for strain and release was 60 sec. The measurement was performed in one cycle for deformation $\epsilon$ and, after the relaxation at release, the constant deformation $\epsilon_p$ was measured as the difference between the length after relaxation and the initial length.

The resilience was calculated from the formula $$Resilience = \frac{\varepsilon - \varepsilon_p}{\varepsilon} \times 100$$

DESCRIPTION OF PREFERRED EMBODIMENT

The invention is still further explained by the following examples which do not limit the scope of the invention.

EXAMPLE 1

85 wt parts of fiber-grade polypropylene granulate with melting point 171–173° C., melt flow index MFI=8.95 g/10 min were blended with 15 wt parts of polyolefin elastomer granulate marked with the trade name Dynaron. The melting temperature of the latter was 151–172° C. and its melt flow index MFI=6.73 g/10 min. The mixture was molten in an extruder at 215–235° C. and a strand (dia 1.5–25mm) was extruded from the melt at 240–245° C. The strand solidified in a water bath and was cut into pieces 2–3mm long. The obtained granulate was dried in a chamber dryer at temperature up to 80° C. From the granulate a multifilament with five single filaments was spun at 260° C. using an extruder-spinning machine. A spin-finish consisting of an 20% water emulsion of Fasavin 2830 was applied on the fibres. The fibres were collected on a bobbin at 500 m/min speed.

The product was a polypropylene multifilament with 467 dtex and tenacity $\sigma_r=6.7$ cN/tex and break elongation $\epsilon_r=760\%$. The multifilament was subjected to longitudinal deformation in one and five cycles at elongation $\epsilon=50\%$. The resilience of the multifilament was 56% and 51% respectively while the Young's modulus E=49.5 cN/tex. The multifilament was drawn on a draw-twister with hot feed godet at 85° C. The drawing was performed under two different conditions: draw ratio-3' take-up speed 230 m/min and draw-ratio-4.5 take-up speed 493 m/min. The properties of the draw multifilament were as follows respectively: titre, 159 dtex and 110 dtex; tenacity, 22.5 cN/tex and 3 1.1 cN/tex; elongation at break, 167% and 75%; and Young's modulus, 129 cN/tex and 256 cN/tex. The drawn multifilament was subjected to a longitudinal deformation at elongation $\epsilon=25\%$ in one and five cycles. The resilience after one cycle was 67% and 65% respectively for the draw ratios 3 and 4.5, after five cycles it was 62% and 61.5% respectively. For comparison non-modified polypropylene multifilament was spun under the same conditions as for the modified yarn. The properties of the non-modified multifilament were as follows: titre 472 dtex, $\sigma_r=8.43$ cN/tex, $\epsilon_r=840\%$, E=122 cN/tex and resilience after one and five cycles-26.3% and 24.8% respectively. The multifilament was drawn at 3 and 4.5 draw-ratios, the resulting titre was respectively 161 dtex and 110 dtex, tenacity 23.9 cN/tex and 37.7 cN/tex, elongation at break 159% and 81%, Young's modulus 254 cN/tex. and 544 cN/tex, resilience at elongation $\epsilon=25\%$ after 1 cycle was 45.2% and 46.6%; after 5 cycles 42.5% and 45.3% respectively.

EXAMPLE 2

70 wt. parts of fiber grade polypropylene were blended with 30 wt. parts of polyolefin elastomer granulate with properties as in Example 1. A strand was extruder from the blend and cut. A five-single-filament multifilament was extruded from the granulate as in Example 1. Modified polypropylene multifilament was obtained with titre 473 dtex, $\sigma_r=7.67$ cN/tex, $\epsilon_r=760\%$ and E=18.8 cN/tex. The resilience for elongation E=50% after one and five cycles was 74.4% and 63.6% respectively. After drawing with 3 and 4.5 draw ratios the multifilament was characterized respectively as follows: titre 163 and 113 dtex, tenacity 19.2 cN/tex and 27.5 cN/tex, elongation at break 163% and 75%, Young's modulus 67.5 cN/tex and 235 cN/tex, resilience at elongation $\epsilon=25\%$ for one cycle 77.9% and 72.3% respectively and for five cycles 72.1% and 67.2% respectively (for the two different draw ratios).

EXAMPLE 3

50 wt. parts of fibre-grade polypropylene granulate with properties as in Example 1 were blended with 50 wt. parts of polyolefin elastomer granulate with properties as in Example 1. A strand was extruded from the blend and cut. A multifilament with five single filaments was spun from the granulate as in Example 1.

Modified polypropylene multifilament was obtained with titre 454 dtex, $\sigma_r$=7,75 cN/tex, $\epsilon_r$=710% and E=9.8 cN/tex. At elongation $\epsilon$=50% the resilience for one and five cycles was 82.5 and 75.5% respectively. After drawing at draw ratios 3 and 4.5 the multifilament was characterized by: titre 159 dtex and 112 dtex, tenacity 14.9 cN/tex and 21.9 cN/tex, elongation at break 139% and 45.5%, Young's modulus 46.8 cN/tex and 130 cN/tex and resilience for 1 cycle at longitudinal deformation $\epsilon$ 25% respectively 86.4% and 80.4%, for five cycles 79.7% and 74% respectively.

EXAMPLE 4

85 wt. parts of polypropylene granulate with properties as in Example 1 were blended with 15 wt. parts of polyolefin elastomer granulate trade mark Dynaron with a Melt Flow Index of 2.33 g/10 mm. and melting temperature 155–175° C.

A strand was extruded from the melt and cut as in Example 1. From the granulate a flat film was extruded using an extruder a horizontal casting head with a slot mouth piece (distance between the clamps-0.3 mm) and a 3-godets take-up unit with controlled speed and godet temperature. The film was formed at 245° C. and 2 MPa pressure of the melt while the take-up speed of the band was 4.8 m/mm. and the godet temperature –20° C. A modified flat film, 0.103 mm thick was obtained with breaking tensile strength 20.5 MPa and elongation at break 610%. Resilience after one cycle of longitudinal deformation for $\epsilon$=25% was 68.4% and 48.5% for E=50%.

EXAMPLE 5

50 wt parts of polypropylene were blended with 50 wt. parts of the elastomer granulate with properties as in Example 4. A strand was extruder from the blend and cut. From the granulate a flat film was extruded as in Example 4.

A flat film was obtained with following characteristics: thickness 0.177 mm, tension at break 19.3 MPa and elongation at break 855%. Resilience for one cycle at longitudinal elongation $\epsilon$=25% was 87.6% and 84.2% for $\epsilon$=50%.

EXAMPLE 6

70wt. parts of polypropylene granulate were blended with 30 wt parts of an elastomer granulate with properties as in Example 4. A strand was extruded from the blend and cut as in Example 1. From the obtained granulate a sleeve film 0.05 mm thick was extruded at 210° C. and 1.8 MPa by means of an extruder equipped with ring bead with 25 mm dia and 0.55 mm slot width. The film was wound up at 4 in/min speed. The blowing ratio of the film was 3.0. A modified polypropylene film was obtained with a tensile strength in the longitudinal direction-25.1 MPa and 23.8 MPa in the perpendicular direction. The elongation at break was 535% longitudinally and 460% perpendicularly. The resilience after one extension $\epsilon$=25% was 72% longitudinally and 62.3% perpendicularly. For the extension $\epsilon$=50% the resilience in longitudinal direction was 58.7%. The sleeve formed from standard polypropylene under the same conditions with the melt temperature of 225° C., was characterized by the following properties: tensile strength at break longitudinally-26.3 MPa and 19.8 MPa perpendicularly, elongation at break 13.1% longitudinally and 2.8% perpendicularly.

EXAMPLE 7

70 hit. parts of fibre-grade polypropylene were blended with 30 wt. parts of an elastomer with the trade mark Engage being a copolymer of ethylene and octene-1 in the 76/24 weight proportion with melting temperature 108–152° C. and melt flow index MFI=2.87 g/10 min. A strand was extruded from the melt and cut. From the granulate a multifilament (five single filaments) was spun as in Example 1. Modified polypropylene multifilament was obtained with titre 460 dtex, $\sigma_r$=8.98 cN/tex, $\epsilon_r$=695% and E=60.5 cN/tex. The resilience at deformation $\epsilon$=50% was after 1 and 5 cycles-41.1% and 34.1% respectively. After drawing at 3 and 4.5 draw ratio the multifilament was characterized respectively by titre, 159 dtex and 107 dtex; tenacity, 18.1 cN/tex and 28.5 cN/tex; elongation at break, 143% and 70%; Young's modulus, 139 cN/tex and 249 cN/tex and resilience at deformation $\epsilon$=25% for 1 cycle 58.5% and 59.1% and for 5 cycles 54.1% and 55% respectively.

EXAMPLE 8

70 wt. parts of a fibre-grade polypropylene granulate and 30 wt. parts of the ethylene-octene copolymer granulate quality-wise as in Example 6 were introduced to an extruder spinning machine. The granulate blend was molten in the extruder at 260° C. and spun through a 5-hole spinneret with a 22 g/min. throughput. A 20% aqueous solution of the spinfinish Fasavin 2830 was applied on the solidified fibres. The fibres were collected on a spool at 500 m/min. speed. The produced multifilament was drawn the same way as in Example 1.

Polypropylene multifilament was obtained with following characteristic before drawing: titre-479 dtex, $\sigma_r$=9.33 cN/tex, $\epsilon_r$=730% and E=67.5 cN/tex. The resilience of the fibres after one and five cycles of deformation at $\epsilon$=50% was 44.6% and 37.6% respectively. After a 3 and 4.5 times drawing the multifilaments properties were following: titre-164 dtex and 113 dtex, tenacity 18.6 cN/tex and 24.5 cN/tex, elongation at break 143% and 57.8%, Young's modulus 148 cN/tex and 282 cN/tex, respectively. The resilience after one cycle of longitudinal deformation at E=25% was 61.7 and 59.5% and after five cycles-56.5% and 56.2% respectively.

EXAMPLE 9

30 wt. parts of standard polypropylene were blended with 70 wt. parts of the ethylene/octene-1 copolymer, quality-wise as in Example 6. A strand was extruded from the blend and cut. From the produced granulate a multifilament was spun as in Example 1. A modified polypropylene multifilament was obtained characterized by following quality indices: titre-460 dtex, $\sigma_r$=8.72 cN/tex, $\epsilon_r$=500% and E=21.1 cN/tex. The resilience after one and five deformation cycles at $\epsilon$=50% was 73.7% and 66.4% respectively.

EXAMPLE 10

The granulate blend as in Example 9 was used as a concentrate of the elastomer. 71.5 wt parts of the concentrate and 95 wt. parts of polypropylene were loaded to the extruder spinning machine and a multifilament was spun as in Example 8. A modified polypropylene multifilament was produced, containing 30% of the elastomer with titre-465 dtex, $\sigma_r$=8.52, $\epsilon_r$=630% and E=85.5 cN/tex. The resilience after one and five cycles of deformation at $\epsilon$=50% was 41.6% and 36.2% respectively. After 3 and 4.5 times drawing the multifilament was characterized by following figures: titre-155 dtex and 108 dtex, tenacity 18.4 cN/tex and 28.9 cN/tex, elongation at break 107% and 39%, Young's modulus 169 cN/tex and 270 cN/tex. The resilience for one cycle of longitudinal deformation $\epsilon$=25% was 58.1% and 64.4% respectively and for five cycles 50.3% and 56.9% respectively.

EXAMPLE 11

85 wt parts of standard polypropylene granulate, quality-wise as in Example 1 were blended with 15 wt parts with the Engage elastomer constituted by the ethylene/octene-1 copolymer in the 76/24 weight proportion with melting temperature 81–105° C. and melt flow index MFI=51.4 g/10 min. The blend was loaded to an extruder spinning machine and a multifilament was spun as in Example 8.

Modified polypropylene multifilament was produced showing following properties: titre 446 dtex, $\sigma_r$=7.2 cN/tex., 800% and E=90.1 cN/tex. The resilience of the fibres after one and five cycles of longitudinal deformation with $\epsilon$=50% was 32.6% and 29% respectively. After 3 and 4.5 times drawing the multifilament was characterized respectively by: titre 159 dtex and 108 dtex, tenacity 22.8 cN/tex and 34.5 cN/tex, elongation at break 155% and 72%, Young's modulus 221 cN/tex and 398 cN/tex. The resilience after one cycle of longitudinal deformation with $\epsilon$=25% was 48.3% and 50.1% respectively and after five cycles 43.5% and 46.7% respectively.

We claim:

1. A polymer composition for extruding modified fibers thereof, comprising a polypropylene composition consisting of polypropylene and an elastomer, the elastomer having a melting temperature from 100 to 180° C., a melt flow index in the range of 2–7 g/10-min., and a density within the range of 0.85–0.95 g/cm$^3$, wherein the elastomer is a branched copolymer selected from the group consisting of an ethylene copolymer, a polyolefin copolymer and a combination thereof, wherein the main chain of the branched copolymer comprises an alkene selected from the group consisting of: ethylene, higher alkene groups, or both ethylene and higher alkene groups, and wherein the polypropylene composition has less than 50 wt. parts of the elastomer.

2. The polypropylene composition and modified fibers thereof according to claim 1, wherein the weight proportion of polypropylene to elastomer is 70 to 30.

3. The polypropylene composition and modified fibers thereof according to claim 1, wherein the elastomer is a copolymer of ethylene and octene.

4. The polypropylene composition and modified fibers thereof according to claim 2, wherein the elastomer is a copolymer of ethylene and octene.

5. The polypropylene composition and modified fibers thereof according to claim 2, wherein the polypropylene composition forms a multifilament have a linear density of about 475 dtex with breaking elongation of about 760%.

6. The polypropylene composition and modified fibers thereof according to claim 1, wherein the polypropylene composition is drawn to form a fiber.

7. A method for producing a polypropylene composition and modified fibers thereof, comprising the steps of:
   (a) blending polypropylene with an elastomer granulate having a melting temperature of from about 100 to 180° C., a melt flow index in the range of about 2 to about 7 g/10-min., a density in the range of 0.85–0.95 g/cm$^3$, with the elastomer being a branched copolymer selected from the group consisting of an ethylene copolymer, a polyolefin copolymer and a combination thereof, wherein the main chain of the branched copolymer comprises an alkene selected from the group consisting of: ethylene, higher alkene groups, or both ethylene and higher alkene groups, and wherein the polypropylene composition has less than 50 wt. part of the elastomer, thereby forming a blend of granulates; and,
   (b) heating the blend of granulates at a temperature of 190–290° C.

8. The method for producing a polypropylene composition and modified fibers thereof according to claim 1, wherein said step of heating the blend of granulates includes the step of heating the blend of granulates to form a melt.

9. The method for producing a polypropylene composition and modified fibers thereof according to claim 8, further comprising the steps of:
   (a) extruding a strand or a band from the melt; and,
   (b) solidifying the strand or band at a temperature in the range of 15–30° C., thereby forming a solidified product.

10. The method for producing a polypropylene composition and modified fibers thereof according to claim 9, further comprising the step of:
    vacuum drying the solidified product at a temperature of 60–80° C.

11. The method for producing a polypropylene composition and modified fibers thereof according to claim 7, wherein the elastomer is present in a weight proportion of 50:50 to 99:1, and is blended with a granulate of a polyolefin carrier, thereby forming a blend with is then regranulated at a temperature of 190–260° C. thereby producing a concentrate, the concentrate then being blended in a weight proportion of 1%–99% with polypropylene.

12. The method for producing a polypropylene composition and modified fibers thereof according to claim 11, wherein the granulate of a polyolefin carrier is a polypropylene carrier.

13. The method for producing a polypropylene composition and modified fibers thereof according to claim 11, wherein the granulate of a polyolefin carrier is a polyethylene carrier.

14. A method for producing a polypropylene composition and modified fibers thereof, comprising the steps of:
    (a) blending polypropylene with an elastomer granulate having a melting temperature from about 100 to 180° C., a melt flow index in the range of 2 to 7 g/10-min., a density in the range of 0.85–0.95, g/cm$^3$, with the elastomer being a branched copolymer selected from the group consisting of an ethylene copolymer, a polyolefin copolymer and a combination thereof, wherein the main chain of the branched copolymer comprises an alkene selected from the group consisting of: ethylene, higher alkene groups, or both ethylene and higher alkene groups, and wherein the polypropylene composition has less than 50wt. part of the elastomer, thereby forming a blend of granulates;
    (b) melting the blend of granulates at a temperature of 190–260° C., thereby forming a melt;
    (c) extruding a strand or a band from the melt;
    (d) solidifying the strand or the band extruded from the melt at a temperature of 15–30° C., thereby forming a granulate; and,
    (e) heating the granulate obtained in said solidifying step at a temperature of 190–290° C., thereby obtaining a polypropylene composition or modified fibers thereof.

15. The method for producing a polypropylene composition and modified fibers thereof according to claim 14, further comprising the step of:
    vacuum drying the granulate obtained in said solidifying step at a temperature of 60–80° C.

16. The method for producing a polypropylene composition and modified fibers thereof according to claim 14, wherein the elastomer is present in a weight proportion of 50:50 to 99:1, and is blended with a granulate of a polyolefin carrier, thereby forming a blend with is then regranulated at a temperature of 190–260° C. thereby producing a concentrate, the concentrate then being blended in a weight proportion of 1%–99% with polypropylene.

17. The method for producing a polypropylene composition and modified fibers thereof according to claim 16, wherein the granulate of a polyolefin carrier is a polypropylene carrier.

18. The method for producing a polypropylene composition and modified fibers thereof according to claim 16, wherein the granulate of a polyolefin carrier is a polyethylene carrier.

* * * * *

UNITED STATES PATENT AND TRADEMARK OFFICE
CERTIFICATE OF CORRECTION

PATENT NO. : 6,576,708 B1
DATED : June 10, 2003
INVENTOR(S) : Struszczyk et al.

It is certified that error appears in the above-identified patent and that said Letters Patent is hereby corrected as shown below:

Column 3,
Line 22, "properties. particulary" should be -- properties, particularly --
Line 34, "σ," should be -- $\sigma_r$ --

Column 4,
Line 22, "3 1.1" should be -- 31.1 --

Column 5,
Line 49, "in/min." should be -- m/min. --
Line 66, "70 hit." should be -- 70 wt. --

Column 7,
Line 67, "according to claim 1" should be -- according to claim 7 --

Signed and Sealed this

Twentieth Day of April, 2004

JON W. DUDAS
*Acting Director of the United States Patent and Trademark Office*